United States Patent

[11] 3,555,200

[72] Inventor Carol H. Eubank
Cedar Hills, Ind.
[21] Appl. No. 764,093
[22] Filed Oct. 1, 1968
[45] Patented Jan. 12, 1971
[73] Assignee Bell Telephone Laboratories, Incorporated
Murray Hill, Berkeley Heights, N.J.
a corporation of New York

[54] FRAUD PROTECTED DIRECT CALL TELEPHONE CIRCUIT

10 Claims, 5 Drawing Figs.

[52] U.S. Cl. 179/18
[51] Int. Cl. H04m 1/40
[50] Field of Search 179/88, 90ADO, B, BD, R, 6.3, 18DC

[56] References Cited

UNITED STATES PATENTS

| | | | |
|---|---|---|---|
| 3,239,609 | 3/1966 | Andregg et al. | 179/6.3 |
| 3,409,741 | 11/1968 | Odom | 179/18(.03) |

FOREIGN PATENTS

| | | | |
|---|---|---|---|
| 197,711 | 5/1923 | Great Britain | 179/6.3 |

*Primary Examiner*—Kathleen H. Claffy
*Assistant Examiner*—David L. Stewart
*Attorneys*—R. J. Guenther and Edwin B. Cave

ABSTRACT: A telephone in which the closure of the switchhook seizes the telephone line and energizes a pair of relays that initiate the operation of sequential switching means if the sequential switching means is in the first of three reference positions. The operated sequential switching means advances to the second reference position wherein the speech transmitter and the hookswitch are disabled and call initiating means are enabled. The call initiating means causes an automatic dial to call a preselected telephone number and at the same time advances the sequential switching means to the third reference position. In this position the speech transmitter and hookswitch are enabled so as to permit conversation with the called station and the dropping of the telephone line when the conversation is completed. The opening of the enabled hookswitch deenergizes the pair of relays, which returns the sequential switching means to the first reference position.

FIG. 1 CONTROL CIRCUIT

INVENTOR
C. H. EUBANK
BY [signature]
ATTORNEY

LINE CIRCUIT

CONTROL CIRCUIT

LINE CIRCUIT

FRAUD PROTECTED DIRECT CALL TELEPHONE CIRCUIT

FIELD OF THE INVENTION

This invention relates to the field of communications and within that field to apparatus, such as a telephone, for automatically transmitting signals that serve to establish a connection between two or more terminals of a communication system.

BACKGROUND OF THE INVENTION

In recent years businesses such as motels and car rental companies have had telephones installed in public locations such as airports and railroad terminals. These telephones permit an individual to call a business without charge to inquire about and obtain the offered accommodations or transportation, and they therefore serve as an inducement for the public to deal with the business.

One way of providing this free telephone service is to connect the telephone at the public location with the business by a direct line. This has the advantage of being quick and simple inasmuch as no dialing is required, but its cost is high. The alternative is to provide a telephone that includes automatic dialing means and let it establish the connection with the business by utilizing the switched network of the telephone system. This has the advantage of being less expensive, but it involves the risk that a user may circumvent the automatic dialing means and use the telephone to call some other telephone number at the expense of the business providing the telephone service.

One common way of doing this is known as hookswitch dialing. Since the hookswitch closes and opens the telephone line it can be used to duplicate the pulsing of the common rotary dial. That is, by briefly depressing the hookswitch actuator, the hookswitch interrupts the telephone line to transmit a pulse thereover and if for example this is done rapidly five times in a row, the five pulses are interpreted as the digit 5 by the switching equipment at the central office. Consequently once access is gained to the central office-switching equipment, the hookswitch actuator can be used in place of a dial.

A second way of circumventing the automatic dial is to duplicate the multifrequency signals generated by the recently introduced pushbutton dials. The multifrequency dial signals are tone signals and therefore can be duplicated by a tone generator or even by playing a taped recording of the dial signals themselves. Furthermore, because the multifrequency dial signals are tone signals they can be sent over the telephone line via the speech transmitter of the telephone handset. Thus once access is gained to the central office switching equipment, the speech transmitter in combination with a multifrequency signal generator can be used in place of a dial.

An object of this invention is to provide a telephone that includes means for automatically dialing a preselected telephone number and also includes means for preventing the use of the telephone for dialing some other telephone number.

SUMMARY OF THE INVENTION

One embodiment of the present invention includes a handset, a cradle for accommodating the handset, and a hookswitch that is closed when the handset is removed from the cradle and opened when the handset is placed in the cradle. The hookswitch upon closing seizes the telephone line and energizes a control relay that initiates the operation of sequential switching means. The sequential switching means has three rest positions referred to as the home, call, and talk positions and the energization of the control relay advances the sequential switching means from the home to the call position.

The sequential switching means when in the call position enables call initiating means and replaces the direct current connection of the hookswitch and the speech network to the telephone line with an alternating current coupling. As a result of the latter, the hookswitch and the transmitter but not the receiver are disabled. The user is therefore able to listen for dial tone, but he is prevented from calling a telephone number by either hookswitch dialing or the sending of multifrequency dial signals via the transmitter.

The call initiating means is thereafter actuated and this causes automatic dialing means to call a preselected telephone number and advances the sequential switching means from the call position to the talk position. In the talk position, the direct current connection to the hookswitch and the speech network is reestablished and the user is able to converse with the called station. Then when the conversation is completed and the hookswitch is opened by the return of the handset to the cradle, the telephone line is dropped and the control relay is deenergized, the latter resulting in the advance of the sequential switching means from the talk to the home position.

A second embodiment of the invention intended for private rather than public use bypasses the illegitimate call protection and includes a manual dial so that the user may call a number either manually or by using the automatic dialing means. In this embodiment, the hookswitch upon closing only seizes the telephone line. The user listens for dial tone and then either closes a call switch or manually dials a telephone number. The closure of the call switch causes the sequential switching means to advance from the home position to the talk position and causes the automatic dialing means to dial a preselected telephone number. The opening of the hookswitch drops the telephone line, and if the call switch has been actuated, causes the sequential switching means to advance to the home position.

DESCRIPTION OF AN ILLUSTRATIVE EMBODIMENT OF THE INVENTION

Figure 1:
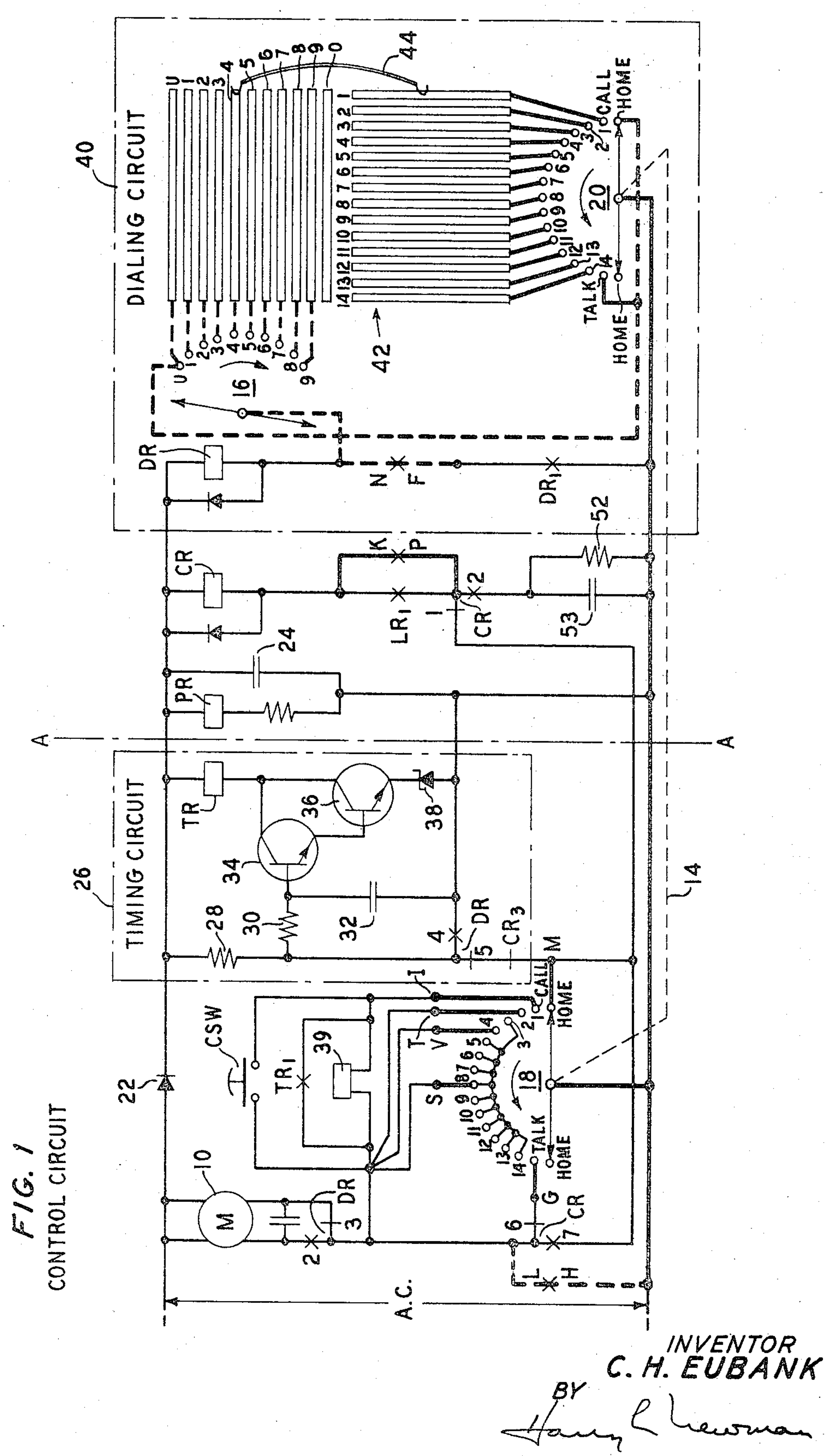
FIG. 1 is a schematic diagram of a control circuit of a preset telephone incorporating illegitimate call protection.

Referring to FIG. 1 of the drawing, the telephone of this invention includes a control circuit connected across an AC source. The control circuit incorporates a reversible motor 10 that acts through a gear train and clutch mechanism (not shown) to rotate a pulsing brush assembly 12 shown schematically in FIG. 3. The gear train and clutch mechanism is so devised that the pulsing brush assembly 12 moves in the same direction regardless of which direction the motor 10 is driven. However, when the motor 10 is driven in what will be referred to as the forward direction, the pulsing brush assembly 12 moves at one speed, and when the motor is driven in what will be referred to as the reverse direction, the pulsing brush assembly moves four times as fast. Such a gear train and clutch mechanism is disclosed in the second illustration on page 82 of the 1959 edition of the Product Engineering Design Manual.

Figure 3:
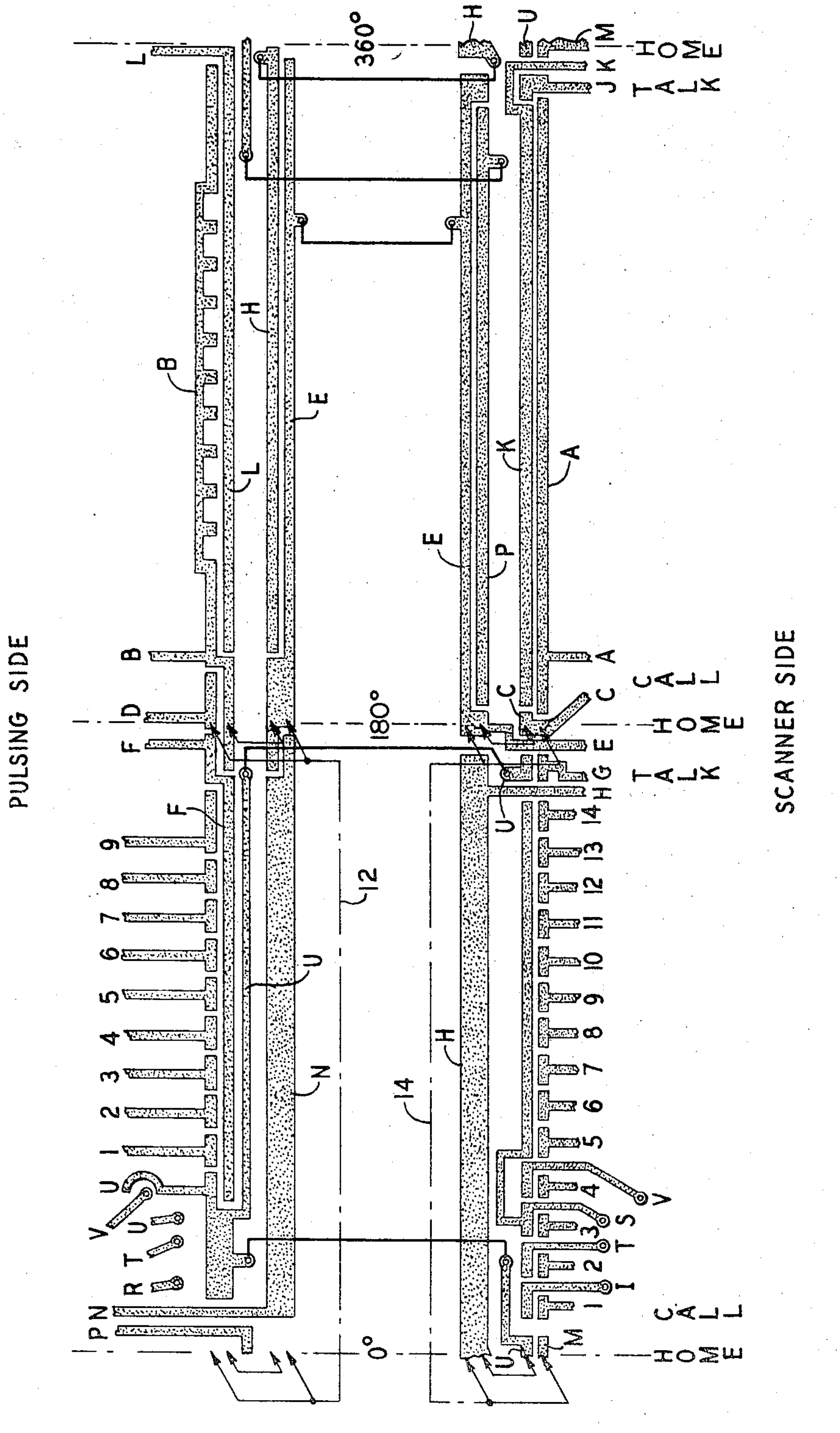
FIG. 3 is a schematic diagram of a printed circuit pattern and the brushes that engage it.

The pulsing brush assembly 12 rotates with respect to a conductive pattern on what is labeled in FIG. 3 as the pulsing side of a printed circuit member, the other side of the member, labeled the scanner side, also having a conductive pattern thereon. The conductive patterns are schematically shown in linear form, but in fact each pattern comprises a plurality of circular conductive paths formed on a dielectric board. The conductive paths are individually lettered A through V and, as indicated by the lines extending between the two patterns, certain of the conductive paths on the pulsing side are electrically connected through the disc to certain of the conductive paths on the scanner side.

A scanner brush assembly 14 rotates with respect to the conductive pattern on the scanner side of the printed circuit disc, and the scanner brush assembly is mechanically coupled to the pulsing brush assembly 12 so that the scanner brush assembly rotates 1/32 of a revolution at the end of each 180° of rotation of the pulsing brush assembly. Such a relationship is readily achieved by coupling the two brush assemblies to a gear train that the pulsing brush assembly 12 only engages every half revolution.

Both the pulsing brush assembly 12 and the scanner brush assembly 14 have eight brushes that extend into engagement with the associated conductive pattern. The brushes on both brush assemblies are symmetrically located along a diameter of the board, four on each side of the center, and as indicated in FIG. 3, the outside two brushes of each foursome are electrically connected together and the inside two brushes of each foursome are electrically connected together. Thus as the brush assemblies rotate, particular conductive paths are interconnected, and after each 180° of rotation the interconnection performed by one group of four brushes is then repeated by the other group of four brushes.

Figure 2:
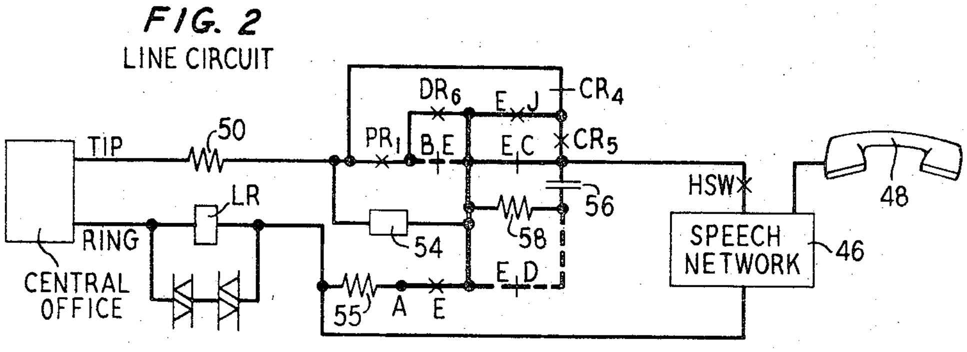
FIG. 2 is a schematic diagram of a line circuit for the preset telephone incorporating illegitimate call protection.

This interconnection provides in effect a plurality of sequentially actuated switches in both the control circuit of FIG. 1 and the line circuit of FIG. 2. The circuit paths that these switches open and close are indicated in FIGS. 1 and 2 by a heavy broken line where the interconnection is on the pulsing side of the printed circuit board and by a heavy solid line where the interconnection is on the scanner side of the board. The switches themselves are with three exceptions identified by the letters of the conductive paths that are interconnected. The three exceptions are a value stepping switch 16 provided by the interconnection of the path N with the paths U and 1 through 9 on the pulsing side of the circuit board, and a position stepping switch 18 and digit stepping switch 20 provided by the interconnection of the path H with the paths U, 1 through 14, M, I, T, S, V, and G on the scanner side of the circuit board.

The switches are all shown in their normal condition in the circuit diagrams of FIGS. 1 and 2 and this is the condition they are in when the pulsing and scanner brush assemblies 12 and 14 are in the position they are shown in FIG. 3, this position being referred to as the home position. Furthermore, as seen in FIG. 3, the scanner brush assembly 14 and the switches provided thereby have two other reference positions identified as the call and talk positions.

Referring again to FIG. 1, the control circuit further includes a timing relay TR, a power relay PR, a control relay CR, and a dialing relay DR, direct current for the operation of the relays being provided by a rectifying diode 22 and a filtering capacitor 24. The timing relay TR is part of a timing circuit 26 that comprises resistors 28 and 30, a capacitor 32, a pair of transistors 34 and 36, and a zener diode 38. The capacitor 32 charges through the resistors 28 and 30, and when the charge exceeds the threshold established by the transistors 34 and 36 and the diode 38, the transistors turn on and the timing relay TR is energized. Whenever the node between resistors 28 and 30 is connected to the negative side of the circuit, the capacitor 32 discharges through the resistor 30, and the timer is reset. The timing relay TR actuates a pair of normally open contacts $TR_1$ that are connected in parallel with a spark suppressive network 39 and with call initiating means such as a manual call switch CSW.

The dialing relay DR, value stepping switch 16, and digit stepping switch 20 are part of a dialing circuit 40 that controls the transmission of pulses corresponding to a preselected telephone number, a number selection matrix 42 providing the means for selecting the telephone number. The number selection matrix 42 has eleven horizontal conductive paths labeled U and 1 through 0 and 10 of the paths are respectively connected to the 10 pads of the value stepping switch 16, the pads being labeled in correspondence to the paths to which they are connected. The selection matrix 42 also has 14 vertical conductive paths that are labeled 1 through 14 and are respectively connected to 14 of the pads of the digit stepping switch 20, the pads again being labeled in correspondence to the paths to which they are connected. Each vertical path represents an individual digit of a telephone number up to 14 digits in length and thus may be more properly referred to as a digit path, and each horizontal path represents a value that may be assigned to each digit and thus may be more properly referred to as a value path.

Mechanical sliders 44, only one of which is shown, electrically connect each digit path with one of the value paths, and each slider is manually positioned so that the digit path associated therewith is connected to a value path corresponding to the value assigned to that digit. Thus if the telephone number to be dialed 464—6079, the slider 42 associated with the digit path labeled 1 is positioned so that it engages the value path labeled 4, the slider associated with the digit path labeled 2 is positioned so that it engages the value path labeled 6, and so on.

It will be seen from this that the slider 44 associated with the digit path labeled 5 is positioned so that it engages the value path labeled 0. The latter path is not connected to any pad on the value stepping switch 18 and thus does not provide a circuit path. This, as will appear from the description of operation, is because the dialing of each digit is achieved by the blanking of one or more of 10 pulses, and when the digit 0 is dialed no blanking is necessary.

Since the telephone number has only 7 digits, no value can be assigned to the last seven of the 14 possible digits. The sliders 44 associated with the digit paths labeled 7 through 14 are therefore positioned so that they engage the value path labeled U which stands for unused. As will appear from the description of operation, in this position of the slider 44 all 10 of the pulses are blanked.

Referring now to FIG. 2, the line circuit is connected across the tip and ring conductors of a telephone line and includes a speech network 46 that incorporates the transmitter and receiver of a handset 48. The handset 48 is accommodated by a cradle (not shown) when the handset is not in use and the line circuit includes a hookswitch HSW that closes when the handset is removed from the cradle and opens when the handset is returned to the cradle. The line circuit also includes a line relay LR that is energized by the flow of current through the circuit.

With the foregoing as background, the operation of the embodiment shown in FIGS. 1 and 2 will now be described.

When power is applied to the control circuit, the power relay PR is energized. Power is necessary for the illegitimate call protection afforded by this embodiment to be operative, and the function of the power relay PR is to detect its presence and absence. Thus when power is present, the power relay PR enables the line circuit of FIG. 2 by closing the normally open contacts $PR_1$ and when power is absent, the power relay disables the line circuit by opening the contacts $PR_1$.

With the contacts $PR_1$ closed, the line circuit is completed when the hookswitch HSW is closed by the removal of the handset 48 from its cradle. A path is provided from the tip conductor through a load resistor 50, the closed contacts $PR_1$, the normally closed sequential switches BE and EC, the closed hookswitch HSW, the speech network 46, and the line relay LR to the ring conductor. Consequently upon the closing of the hookswitch HSW the telephone line is seized and the line relay LR is energized, closing the normally open contacts $LR_1$ in the control circuit.

The closed contacts $LR_1$ energize the control relay CR, a path being provided from the positive side of the circuit through the control relay, the closed normally open contacts $LR_1$, the normally closed contacts $CR_1$, the node M, and the home pad and brush of the position stepping switch 18 to the negative side of the circuit. The energized control relay CR closes normally open contacts $CR_2$ to provide an alternate energizing path through a resistor 52, a capacitor 53 being connected in parallel with the resistor to assure positive lockup of the relay, and opens the normally closed contacts $CR_1$ to terminate the previous path. In addition, it opens normally closed contacts $CR_3$ in the timing circuit 26 and because this interrupts the path to the negative side of the circuit, the operation of the timing circuit is initiated.

Furthermore, normally closed contacts $CR_4$ open and normally open contacts $CR_5$ close in the line circuit, the former interrupting a shunt path and the latter preparing a talk path. Finally, normally closed contacts $CR_6$ open and normally open contacts $CR_7$ close in the control circuit and the motor 10 is energized in a forward direction, a path extending from one side of the circuit through the motor, normally closed contacts $DR_3$, closed normally open contacts $CR_7$, the node M, and the home pad and brush of the position stepping switch 18 to the other side of the circuit.

The motor 10 moves the pulsing brush assembly 12 (FIG. 3) from the home position at low speed and the value stepping switch 16 advances to the U pad. A path is thereupon completed from the positive side of the control circuit through the drive relay DR, the brush and U pad of the value stepping switch 16 to the brush and home pad of the digit stepping switch 20 to the negative side of the circuit. The dialing relay DR is energized and the normally open contacts $DR_1$ close so that when shortly thereafter the normally open sequential switch NF closes an alternate energizing path is provided for the relay, the previous energizing path being terminated when the brush of the value stepping switch 16 advances from the U pad. At the same time normally open contacts $DR_2$ close and normally closed contacts $DR_3$ open to reverse the motor 10 and thereby advance the pulsing brush assembly 12 at high-speed. In addition, normally open contacts $DR_4$ close and normally closed contacts $DR_5$ open to reset the timing circuit 26 and contacts $DR_6$ close to provide a shunt path around the normally closed sequential switch BE in the line circuit.

As the pulsing brush assembly 12 (FIG. 3) advances, the normally open sequential switch LH closes to provide for the motor 10 an alternate energizing path to that through the position stepping switch 18. Furthermore, the normally closed sequential switch BE repetitively opens and closes ten times in the line circuit to provide dial pulses, both the pulsing switch BE and the normally open contact $PR_1$ being shunted by a spark suppression network 54. However, because the normally open contacts $DR_6$ are closed, no pulses are transmitted. Then just before the pulsing brush assembly 12 completes 180° of rotation, the sequential switches NF and LH reopen and the scanning brush assembly 14 (FIG. 3) advances 1/36 of a revolution.

The reopening of the sequential switch NF deenergizes the dialing relay DR and the contacts $DR_2$ reopen the reverse energizing path of the motor 10 while the contacts $DR_3$ reclose in the forward energizing path of the motor. In addition, the contacts $DR_4$ reopen in the timing circuit 26 and initiate the timing interval, and the contacts $DR_6$ reopen in the shunt path around the pulsing switch BE.

The advancement of the scanning brush assembly 14 moves the position and digit stepping switches 18 and 20 from the home to the call positions and as a result, the reopening of the sequential switch LH deenergizes the motor 10. In addition, the advancement of the scanning brush assembly 14 opens the normally closed sequential switch EC and closes the normally open sequential switches AE and KP.

The open sequential switch EC removes the direct current from the hookswitch HSW and the speech network 46 by interrupting the line current path therethrough, while the closed sequential switch AE in series with a resistor 55 provides an alternate line current path. Consequently the hookswitch HSW if opened does not interrupt or drop the telephone line, and since no DC bias is provided to the transmitter of the speech network 46, the transmitter is inoperative. However, an AC connection still remains through a capacitor 56 and the normally closed sequential switch ED and so the receiver of the speech network 46 still functions to permit the user to listen for dial tone. Finally, the closed sequential switch KP assures that the control relay CR remains energized until the scanner brush assembly 14 advances to the talk position.

The user, upon hearing dial tone, closes the call switch CSW to initiate the calling of the preselected telephone number and thereby energizes the motor 10, a path being provided from one side of the circuit through the motor, the normally closed contacts $DR_3$, the closed call switch, the node I, and the call or 1 pad and brush of the position stepping switch 18 to the other side of the circuit. The energized motor 10 advances the pulsing brush assembly 12 at a slow speed and shortly thereafter the normally open sequential switch LH closes so that the motor remains energized when the call switch CSW is released. At about the same time the sequential switch ED opens in the line circuit to place a resistor 58 in the AC path of the speech network 46 and mute the pulsing that follows.

Pulsing is achieved by the repetitive opening of the normally closed pulsing switch BE, each opening of the switch serving to interrupt the DC path of the telephone line and transmit a pulse thereover unless the switch is shunted by the closing of the normally open contacts $DR_6$. The pulsing switch BE is synchronized with the brush of the value stepping switch 16 so that the switch opens while the brush is in engagement with one pad and then closes as the brush moves into engagement with the subsequent pad. Thus if the normally open contacts $DR_6$ are not closed, a first pulse is transmitted as the brush of the value stepping switch 16 advances from the U pad to the 1 pad, a second pulse is transmitted as the brush advances from the 1 pad to the 2 pad and so on until a tenth pulse is transmitted as the brush advances from the 9 pad.

The normally open contacts $DR_6$ close when the dialing relay DR is energized in response to the provision of a path through the number selection matrix 42, the point at which the path is provided being determined by the location of the sliders 44. In the case of the slider 44 shown for the first digit, a path is completed through the number selection matrix 42 when the brush of the value stepping switch 16 engages the 4 pad. As seen from the previous paragraph, four pulses will have been transmitted when the brush reaches this position. The dialing relay DR is then energized through the path including the brush and 4 pad of the value stepping switch 16, the 4 value path, slider 44, and 1 digit path of the number selection matrix 42, and the call or 1 pad and brush of the digit stepping switch 20.

The dialing relay DR locks up through its own contacts $DR_1$, the normally open sequential switch NF having closed earlier. In addition, the normally open contacts $DR_2$ close and the normally closed contacts $DR_3$ open to reverse the motor 10 and thereby advance the pulsing brush assembly 12 at high speed, while the normally open contacts $DR_4$ close to reset the timing circuit 26. The dialing relay DR remains energized until the sequential switch NF reopens after the brush of the value stepping switch 16 has completed scanning all of the paths, this being the same as the pulsing brush assembly 12 completing a half revolution.

As the pulsing brush assembly 12 (FIG. 3) completes a half revolution, the scanner brush assembly 14 is advanced 1/32 of a revolution whereby the brushes of the position and digit stepping switches 18 and 20 are advanced to the 2 pad. If the node T associated with the position stepping switch 18 is connected in the manner shown, the transmission of the second digit of the preselected telephone number commences, the motor 10 being energized through the normally closed contacts $DR_3$, the node T, and the 2 pad and brush of the position stepping switch. If on the other hand the node T is connected instead to the node I, the motor 10 is deenergized. This latter connection is used when it is necessary to dial a single digit access code and then listen for a second dial tone. In this situation the user upon hearing the dial tone again closes the call switch CSW and then the dialing of the second digit commences.

This same option is provided after the transmission of the third digit when the energizing path of the motor is through the node V and the 4 pad and brush of the position stepping switch 18. If the node V is connected as shown, the fourth digit is transmitted without a pause after the third digit. But where it is necessary to dial a three digit access code, the node V is connnected to the node I and the dialing stops to permit the user to listen for dial tone. The user then closes the call switch CSW and initiates the dialing of the remainder of the digits, the energizing path for the motor 10 being through the node S and the 3 and 5 through 14 pads and brush of the position stepping switch 18.

The cycle for each digit with the exception of the fifth and the eighth through fourteenth digits is the same as that described for the first digit, pulses being transmitted until a path is provided through the number selection matrix 42 and the pulsing commutator 12 advancing at slow speed while the pulses are being transmitted and then advancing at high-speed during the remainder of each cycle. The fifth digit in the assumed preselected telephone number is a zero and in this case no path is ever completed through the number selection matrix 42. Consequently, the dialing relay DR is not energized, all 10 pulses are transmitted out on the telephone line, and the pulsing brush assembly 12 only rotates at slow speed.

The eighth through fourteenth digits in the assumed preselected telephone number unused, thus the dialing relay DR is energized when the value stepping switch 16 engages the U pad. In addition, because there is about a 35 millisecond delay in the release of the dialing relay DR when its circuit is opened, and because this is a greater amount of time than the circuit remains open when consecutive digits are unused, the dialing relay remains energized until the scanner brush assembly 14 advances to the talk position. As a result, during this time no pulses are transmitted and the pulsing brush assembly 12 is driven at high-speed.

When the scanner brush assembly 14 advances to the talk position, the brushes of the position and digit stepping switches 18 and 20 are advanced to the talk pad, and the motor 10 is again deenergized. Furthermore, the sequential switches KP and AE reopen while the sequential switch EJ closes. The reopening of the sequential switch KP makes the control relay CR responsive to the line relay LR through its normally open contacts $LR_1$. The reopening of the sequential switch AE and the closing of the sequential switch EJ apply direct current to the speech network 46 through the hookswitch HSW, the path extending from the tip conductor through the closed normally open contacts $PR_1$, the normally closed pulsing switch BE, the closed normally open sequential switch EJ, the closed normally open contacts $CR_5$, the hookswitch and speech network, and the line relay LR to the ring conductor. As a result the transmitter of the speech network 46 is enabled so that the user may converse with the called station. In addition, the user is able to drop the telephone line when the conversation is completed by opening the hookswitch HSW.

When the hookswitch HSW opens, the line relay LR is deenergized, and the contacts $LR_1$ reopen to deenergize the control relay CR. The contacts of the control relay CR return to their normal condition and the reclosing of the contacts $CR_6$ energizes the motor 10, the energizing path comprising the normally closed contacts $DR_3$, the normally closed contacts $CR_6$, the node G, and the talk pad and brush of the position stepping switch 18. The motor 10 drives the pulsing brush assembly 12 at slow-speed until the brush of the value stepping switch 16 engages the U pad whereupon a path is provided from the positive side of the circuit through the dialing relay DR, the brush and U pad of the value stepping switch, and the talk pad and brush of the digit stepping switch 20 to the positive side of the circuit, and the dialing relay is energized. The normally open contacts $DR_2$ then close and the normally closed contacts $DR_3$ open and the motor 10 is reversed to drive the pulsing brush assembly 12 at high-speed during the remainder of the cycle. After the pulsing brush assembly 12 moves into the home position, it advances the scanner brush assembly 14 from the talk to the home position and the motor 10 is deenergized. The telephone is now reset to a quiescent condition.

If when the scanner brush assembly 14 is in the call position the user instead of closing the call switch CSW attempts to hookswitch dial or transmit multifrequency tone signals via the transmitter of the handset 48, he is of course thwarted because both of the hookswitch and transmitter are disabled. Furthermore, after the elapse of a number of seconds, the timing relay TR of the timing circuit 26 is energized to close the normally open contacts $TR_1$. These contacts are in parallel with the call switch CSW and thus perform the same function as the closing of the call switch, and so the preselected telephone number is called even though the call switch is not closed. The telephone is then reset to the quiescent condition if the handset 48 has been returned or when the handset is returned to the cradle and the hookswitch HSW opens. From this it is seen that it is possible to eliminate the call switch CSW and only rely on the timing circuit 26 to initiate the calling of the preselected telephone number. Another alternative would be to substitute a dial tone detector for the call switch CSW to initiate the calling of the preselected telephone number.

SECOND ILLUSTRATIVE EMBODIMENT

In a second embodiment of the telephone of this invention, the illegitimate call protection is eliminated and the user is provided the option of manually dialing telephone numbers or using the automatic dialing means to dial a preselected telephone number. Such an arrangement would be useful in a branch office of a business where it is necessary to make frequent calls to the main office, the automatic dialing means being used to make the main office calls.

Figure 4:
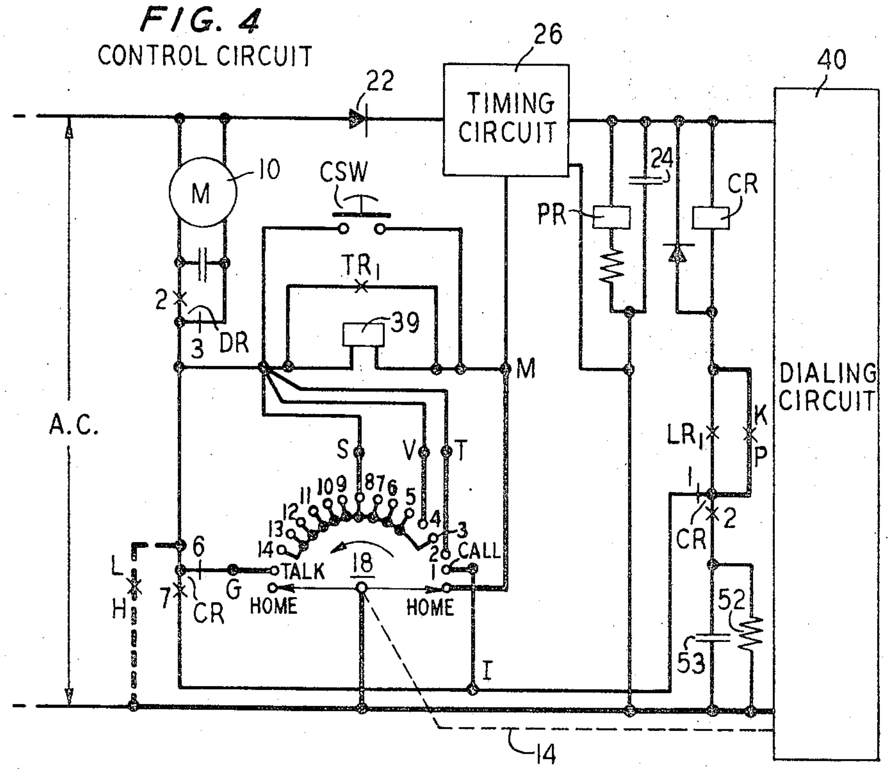
FIG. 4 is a schematic diagram of the control circuit of FIG. 1 modified to eliminate the illegitimate call protection.
Figure 5:
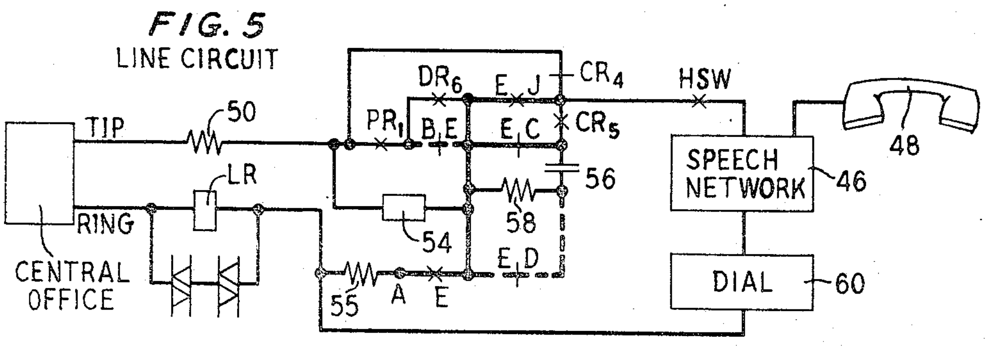
FIG. 5 is a schematic diagram of the line circuit of FIG. 2 modified to eliminate the illegitimate call protection.

The telephone is the same as the first embodiment except that it includes a manual dial 60 and there are several changes in the wiring of the circuits. In the control circuit as shown in FIG. 4, the connection of the node M is reversed with the connection of the node I and in the line circuit as shown in FIG. 5 the hookswitch HSW and speech network 46 are connected to the node between the normally closed contacts $CR_4$ and the normally open contacts $CR_5$ instead of to the node between the normally open contacts $CR_5$ and the capacitor 56.

As a result of these changes the manual dial 60 can be used to make telephone calls even if power is removed from the control circuit. This is because the line path for the hookswitch HSW, speech network 46, and dial 60 is through the normally closed contacts $CR_4$ except when the automatic dialing feature of the invention is used. In that case the line path is through the normally open contacts $PR_1$, the normally closed sequential switches BE and EC, and the normally open contacts $CR_5$, the contacts $PR_1$ closing in response to the energization of the power relay PR and the contacts $CR_5$ closing and $CR_6$ opening in response to the energization of the control relay CR. Since the two paths are in parallel with one another and since the contacts $CR_4$ will always close if power is withdrawn from the control circuit, manual use of the telephone is not dependent upon such power.

In addition, although the closure of the hookswitch HSW still results in the energization of the line relay LR, the closing of the normally open contacts $LR_1$ does not energize the control relay CR. Consequently the motor 10 is not energized to advance the pulsing brush assembly 12 from its home position, the operation of the dialing circuit 26 is not initiated, and the path through the line circuit is unchanged. Thus the user is free to use the manual dial 60 to make calls if he so desires.

If on the other hand he wishes to use the automatic dialing means to call the preselected telephone number, he need only close the call switch CSW as before. The closed call switch CSW energizes the motor 10, a path extending through the normally closed contacts $DR_3$, the call switch, the node M, and the home pad and brush of the position stepping switch 18, and the pulsing brush assembly 12 is advanced from its home position.

At the end of a half revolution when the scanner brush assembly 14 and thereby the position and digit stepping switches 18 and 20 are advanced to the call position, the control relay CR is energized through the normally closed contacts $CR_1$, the node I, and the call or 1 pad and brush of the position stepping switch. The control relay locks up through normally open contacts $CR_2$ and the resistor 52, and the closure of the normally open contacts $CR_7$ applies power to the motor 10 through the node I and the call or 1 pad and brush of the position stepping switch 18. Thus the telephone does not stop in the call position but commences immediately to dial the preselected telephone number. The rest of the operation is the same as previously described.

I claim:

1. A telephone comprising: a speech transmitter;
telephone activating means;
means responsive to the actuation of the telephone activating means for disabling the transmitter;
automatic dialing means for thereafter calling a preselected telephone number; and
means responsive to the completion of the calling of the preselected telephone number by the automatic dialing means for enabling the transmitter.

2. A telephone as defined in claim 1 wherein the means responsive to the actuation of the telephone activating means also disables the telephone activating means and the means responsive to the completion of the calling of the preselected telephone number by the automatic dialing means also enables the telephone activating means.

3. A telephone as defined in claim 1 further including call initiating means for initiating the calling of the preselected telephone number by the automatic dialing means, the call initiating means being enabled responsive to the actuation of the telephone activating means.

4. A telephone associated with a telephone line comprising:
telephone activating means;
sequential switching means having first, second, and third reference positions;
control means, the control means being energized and the telephone line being seized responsive to the actuation of the telephone activating means only when the sequential switching means is in the first reference position, the sequential switching means advancing from the first reference position to the second reference position responsive to the energization of the control means;
call initiating means enabled only when the sequential switching means is in the second reference position;
means for automatically dialing a preselected telephone number responsive to the actuation of the call initiating means, the sequential switching means advancing to the third reference position responsive to the actuation of the call initiating means; and
the control means being deenergized and the telephone line being dropped responsive to the deactuation of the telephone activating means only when the sequential switching means is in the third reference position, and the sequential switching means being advanced to the first reference position responsive to the deenergization of the control means.

5. A telephone as defined in claim 4 wherein the call initiating means comprises a timing circuit that automatically initiates the operation of the automatic dialing means after the lapse of a particular period of time following the advancement of the switching means to the second reference position.

6. A telephone as defined in claims 3 or 4 wherein the call initiating means is a manual switch that is closed to initiate the operation of the automatic dialing means.

7. A telephone as defined in claim 4 further including a handset incorporating a transmitter and receiver and a cradle for accommodating the handset when it is not in use, and the telephone activating means comprises a hookswitch that is actuated when the handset is removed from the cradle and is deactuated when the handset is returned to the cradle.

8. A telephone as defined in claim 4 further including a speech transmitter, the transmitter being disabled when the sequential switching means advances out of the first reference position and being enabled when the sequential switching means advances into the third reference position.

9. A telephone as defined in claims 4 or 8 wherein the telephone activating means is disabled when the sequential switching means advances out of the first reference position and is enabled when the sequential switching means advances into the third reference position.

10. A telephone associated with a telephone line comprising:
a handset and a cradle for accommodating the handset when it is not in use;
a hookswitch that is closed when the handset is removed from the cradle and opened when the handset is placed in the cradle;
sequential switching means having first, second, and third reference positions;
a call initiating switch, the call initiating switch being enabled and the telephone line being seized responsive to the closure of the hookswitch when the sequential switching means is in the first reference position;
means for automatically dialing a preselected telephone number responsive to the actuation of the call initiating switch when the sequential switching means is in the first reference position, the sequential switching means advancing to the second reference position responsive to the actuation of the call initiating switch; and
control means energized when the sequential switching means is in the second reference position, the sequential switching means advancing to the third reference position responsive to the energization of the control means, the control means being deenergized and the telephone line being dropped responsive to the opening of the hookswitch when the sequential switching means is in the third reference position, and the sequential switching means being advanced to the first reference position responsive to the deenergization of the control means.